United States Patent
Paulovich (10) Patent No.: US 9,489,859 B2
(45) Date of Patent: Nov. 8, 2016

(54) MUSIC TEACHING DEVICE

(71) Applicant: Federico Paulovich, Lomagna Lc (IT)

(72) Inventor: Federico Paulovich, Lomagna Lc (IT)

( * ) Notice: Subject to any disclaimer, the term of this patent is extended or adjusted under 35 U.S.C. 154(b) by 0 days.

(21) Appl. No.: 14/760,563

(22) PCT Filed: Jan. 14, 2014

(86) PCT No.: PCT/EP2014/050546
§ 371 (c)(1),
(2) Date: Jul. 13, 2015

(87) PCT Pub. No.: WO2014/111361
PCT Pub. Date: Jul. 24, 2014

(65) Prior Publication Data
US 2015/0379885 A1    Dec. 31, 2015

(30) Foreign Application Priority Data
Jan. 16, 2013   (IT) ............... MI2013A0048

(51) Int. Cl.
*G09B 15/00* (2006.01)
*G09B 15/02* (2006.01)
*G09B 1/20* (2006.01)

(52) U.S. Cl.
CPC ............ *G09B 15/00* (2013.01); *G09B 1/20* (2013.01); *G09B 15/02* (2013.01)

(58) Field of Classification Search
CPC .......................... G09B 15/00; G09B 15/02
See application file for complete search history.

(56) References Cited

U.S. PATENT DOCUMENTS

| 128,591 | A | * | 7/1872 | Clarke | G09B 15/00 84/456 |
| 255,979 | A | * | 4/1882 | Hauschel | G09B 15/00 84/470 R |
| 490,509 | A | * | 1/1893 | Showalter | G09B 15/007 84/474 |
| 2,476,580 | A | * | 7/1949 | Bergman | G09B 19/02 273/143 R |
| 3,091,361 | A | * | 5/1963 | Gawron | B65D 21/0219 206/508 |
| 3,674,905 | A | * | 7/1972 | Collins, Sr. | G09B 1/20 434/174 |
| 3,717,942 | A | * | 2/1973 | Presby | G09B 17/00 273/155 |
| 4,134,326 | A | * | 1/1979 | Hutton | G09B 15/004 434/402 |
| 4,295,832 | A | * | 10/1981 | Karell | A63F 9/0098 273/456 |

(Continued)

FOREIGN PATENT DOCUMENTS

GB    2 190 234 A    11/1987
WO    93/25995 A1    12/1993

(Continued)

*Primary Examiner* — Robert W Horn
(74) *Attorney, Agent, or Firm* — Jacobson Holman, PLLC.

(57) ABSTRACT

A music teaching device for the composition and reading of a score is described, of the type comprising coaxial elements assembled along a central axis and rotatable with respect thereto. Said coaxial elements are arranged according to a series of stable geometry configurations alternative to a series of geometric unstable configurations.

2 Claims, 7 Drawing Sheets

(56) References Cited

U.S. PATENT DOCUMENTS

| | | | | |
|---|---|---|---|---|
| 4,651,992 A | * | 3/1987 | Danino | A63F 9/0098 273/155 |
| 4,716,806 A | * | 1/1988 | Forrest | G09B 15/02 84/474 |
| 4,865,324 A | * | 9/1989 | Nesis | A63F 9/0811 273/155 |
| 5,083,788 A | * | 1/1992 | Conotter | A63F 9/083 273/153 S |
| D342,547 S | * | 12/1993 | Putman | D19/64 |
| 5,788,232 A | * | 8/1998 | Binkley | A63F 9/0811 273/153 S |
| 5,824,931 A | * | 10/1998 | Papadopoulos | G10G 1/02 84/474 |
| 5,957,453 A | * | 9/1999 | Binkley | A63F 9/0811 273/153 S |
| 6,031,172 A | * | 2/2000 | Papadopoulos | G09B 15/004 84/470 R |
| 6,881,066 B1 | * | 4/2005 | Sarconi | G09B 1/18 273/153 S |
| 7,485,793 B1 | | 2/2009 | Divine | |
| 8,302,967 B2 | * | 11/2012 | Kim | A63F 9/0826 273/153 S |
| 8,455,747 B2 | * | 6/2013 | Lozano, Jr. | G09B 15/00 84/470 R |
| D710,456 S | * | 8/2014 | Berkshire | D21/468 |
| 8,973,881 B2 | * | 3/2015 | Mihajlovic | F21S 6/001 206/303 |
| 2009/0031880 A1 | * | 2/2009 | Chu | G09B 15/02 84/476 |
| 2015/0379885 A1 | * | 12/2015 | Paulovich | G09B 1/20 84/471 R |

FOREIGN PATENT DOCUMENTS

| | | |
|---|---|---|
| WO | 94/20950 A1 | 9/1994 |
| WO | 99/12142 A1 | 3/1999 |

* cited by examiner

MUSIC TEACHING DEVICE

BACKGROUND OF THE INVENTION

The operation of a mechanical device for the composition and reading of a music score is based on the concepts of: rhythmic pulsation, also named beat; the names of the notes according to their respective duration values, the value and number of beats.

The presence of a constant rhythmic pulsation, which divides time into equal parts so as to provide a reference "grid" for the reader or player, is necessary to read, interpret and play a score. The pulsation speed is expressed in bpm (beats per minute) and hypothetically may vary from 1 bpm to +infinite bpm. Commonly, bpm from 30 to 300 are adopted.

Each note corresponds to a sound and various note values exist to determine their duration in time. The whole note is the longest note, to which the value of 1/1 (one whole) is attributed; the values of the other notes are obtained by dividing always by 2 (to obtain 1/64 or 1/128, for example).

In order to determine the actual duration of a note in time, a value that is included in the note values must be attributed to the beats (rhythmic pulsations) so as to establish a concrete relationship.

Example: a pulsation of 60 bpm is given. It is established that each pulsation (beat) equals 1/4 (one quarter note). In such a case, a whole note (4/4 note) will last for 4 seconds. By increasing the pulsation to 120 bpm, but maintaining a value of 1/4, the same whole note (4/4 note) will last exactly half the time, i.e. 2 seconds.

By maintaining instead the pulsation at 120 bpm, but changing the value from 1/4 to 1/8 (one eighth note) the same whole note (4/4 note) will last for 4 seconds again.

After having established the value, groups of beats must be created to allow to divide the score into equal segments. Such segments are called bars or measures and allow to read the part from a given point or to repeat some parts by means of the so-called "ritornello" signs.

The tempo type according to which the part will be written is determined at the beginning of the score by means of a numeric fraction. This means establishing how many beats there must be within each measure and what their value will be.

Example: fraction 3/4 at the beginning of the part means that within each bar there will be 3 beats in each bar, having a value of 1/4 each. Thus, the numerator indicates the number of beats and the denominator determines the value thereof. Consequently, there are no numeric limits for the numerator, but such limits exist instead for the denominator, which must indicate a value included in the note values (4 means 1/4, 8 means 1/8 etc.).

Furthermore, the sum of the note values and of the pauses contained in the same bar must correspond to the value expressed at the beginning of the score.

Teaching devices of the mechanical type, formed by rollers or faceted disks, which turn independently to provide information on the combinations of musical scores to be played, are known in the prior art.

For example, according to U.S. Pat. No. 6,031,172 a music teaching device comprises a number of rings positioned so as to have an independent movement by turning on a base element. According to the shape of the base element, the reference rings are either coaxial cylindrical sleeves or concentric rings. The outer surface of each ring is divided into segments which can be identified by means of predetermined colors. Each segment shows signs referring to a note of the chromatic scale. The device works so that, when the various ring segments are aligned according to the same color, the corresponding segments of each next ring represent the notes of a non-chromatic scale.

In each of the prior art, it is the object of the present invention to make a music teaching device which can further facilitate the study and learning of a musical instrument by combining a sequence of music fragments to compose a plurality of musical pieces, in particular rhythmic pieces, in more stable, easily changeable and repetitive manner.

BRIEF SUMMARY OF THE INVENTION

In accordance with the present invention, said object is reached by means of a music teaching device for the composition and reading of a score, of the type comprising coaxial elements assembled along a central axis and rotatable with respect thereto, characterized in that said coaxial elements are arranged according to a series of geometric stable configurations alternate to a series of geometric unstable configurations.

BRIEF DESCRIPTION OF THE SEVERAL VIEWS OF THE DRAWINGS(S)

The features of the present invention will be more apparent in the following description of some practical embodiments shown by way of non-limitative example in the accompanying drawings, in which.

DETAILED DESCRIPTION OF THE INVENTION

With reference FIGS. 1, 2, 9 and 10, an embodiment of a music teaching device 1 comprises a cylinder 10 with axes thereof coinciding with a central axis 111. Coaxial elements 20a, 20b, 20c and 20d comprised between two disks 40 adapted to assemble axially said coaxial elements 20a, 20b, 20c, 20d are rotatably associated to such a cylinder 10.

Figure 3:
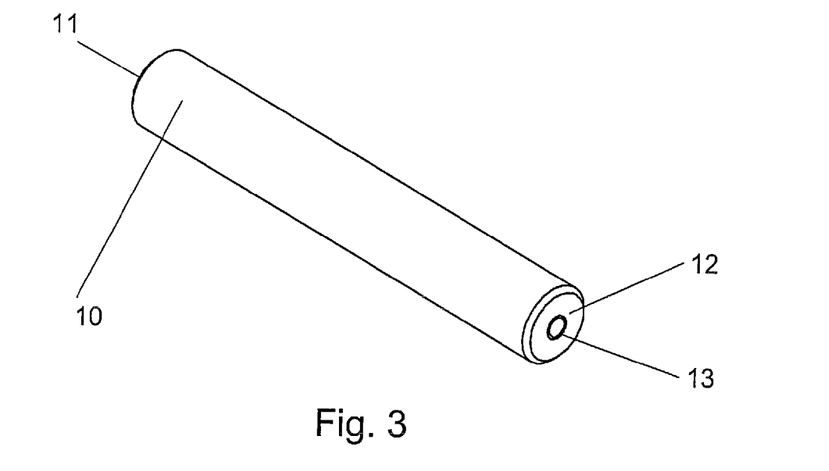
FIG. 3 shows a cylinder belonging to the device in FIGS. 1 and 2.
Figure 4:
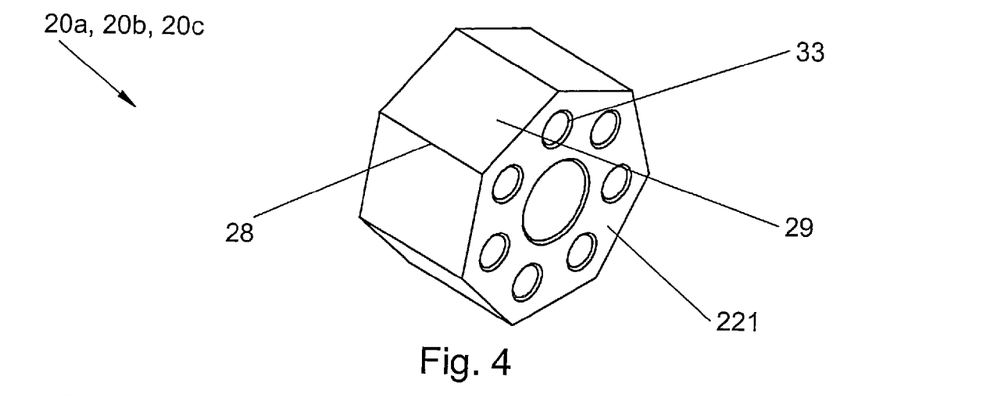
FIGS. 4 and 5 show perspective views of a prism belonging to the device in FIGS. 1 and 2.
Figure 5:
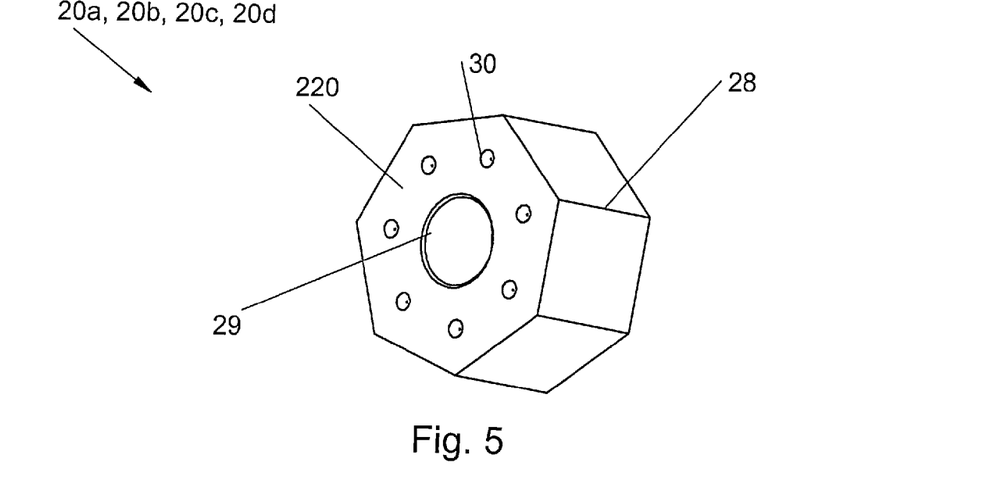

The cylinder 10 (FIG. 3) is delimited by two faces, 11 and 12, crossed in the center by a threaded hole 13, used to fix a respective disk 40 by means of a screw (not shown).

Figure 6:
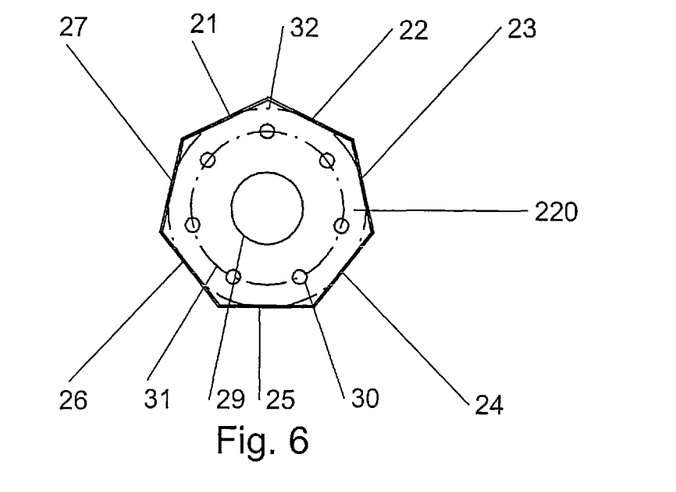
FIG. 6 shows a front view of the rear base of a prism belonging to the device in FIGS. 1 and 2.
Figure 7:
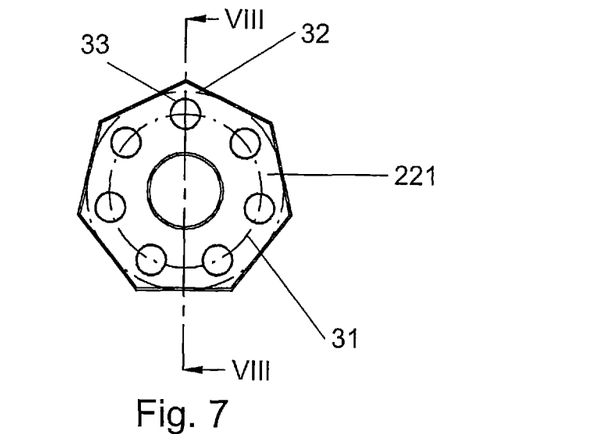
FIG. 7 shows a partial front view of the front base of the prism in FIG. 6.
Figure 8:
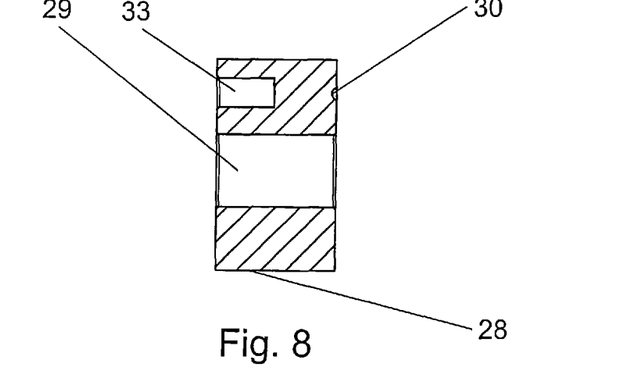
FIG. 8 shows a section view taken along line VIII-VIII in FIG. 7.

With reference to FIGS. 6, 7 and 8, each coaxial element 20a, 20b, 20c and 20d is a right prism constructed by rectangles having sides 21, 22, 23, 24, 25, 26 and 27 of a base polygonal for base and the height 28 itself of the prism for height.

Each prism 20a, 20b, 20c and 20d is rotatably associated to the cylinder 10 by means of a cylindrical central hole 29. A first base 220 of each prism is provided with a series of spherical cap shaped hollows 30, equally distributed on a circumference 31 comprised between the hole 29 and the circumference 32 inscribed in the base polygonal, preferably in number equal to the number of sides of the base polygonal.

A second base 221 of each prism 20a, 20b and 20c is provided with cylindrical blind holes 33 respectively aligned with the hollows 30. It is worth noting that the prism 20d does not have holes 33.

Figure 9:
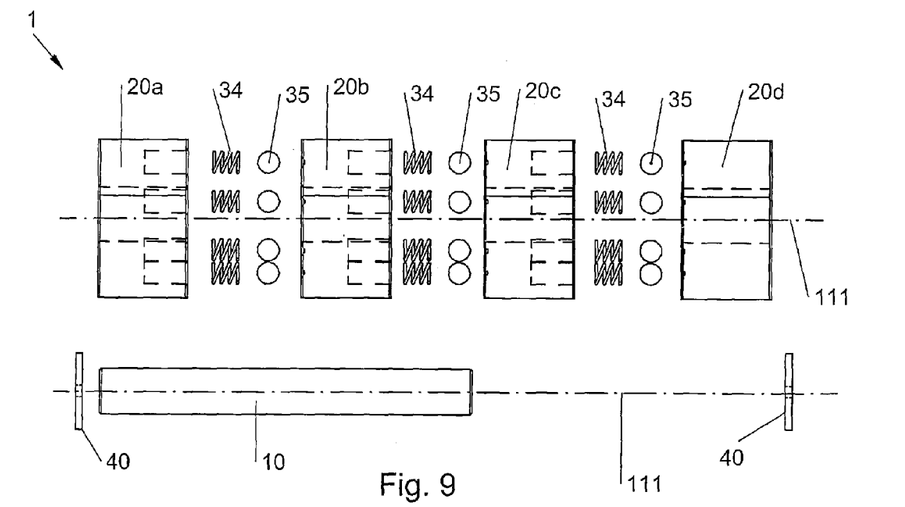
FIG. 9 shows an exploded view of the main components of the device in FIGS. 1 and 2.
Figure 10:
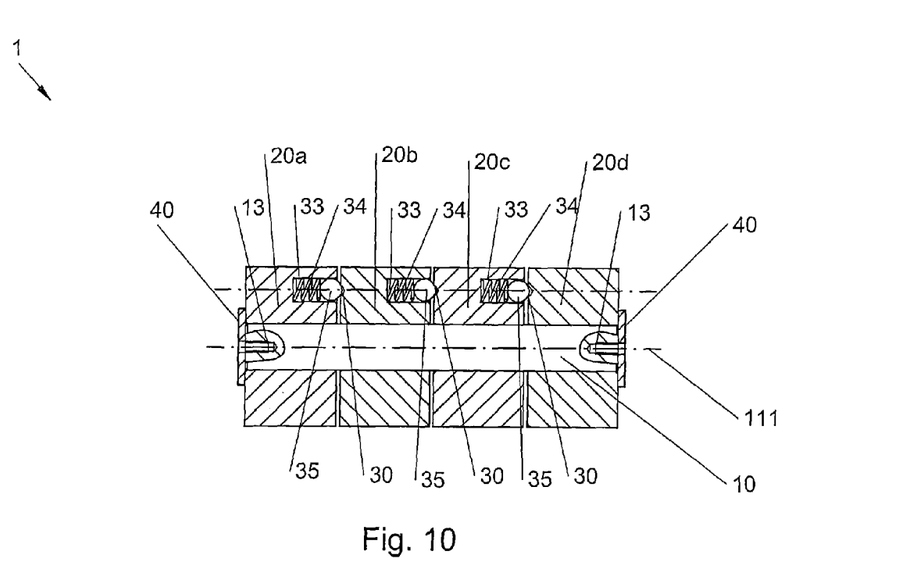
FIG. 10 shows a section view of the device in FIG. 1 according to an axial plane passing through a vertex of the base polygonal of the aligned prisms.

With reference to FIGS. 9 and 10, an elastic spring 34 occupies the seat of each hole 33, pressing a ball 35 against the base 220 of the adjacent prism.

The cylinder 10 supports and maintains the prisms 20a, 20b, 20c and 20d, comprised between the disks 40, aligned with an axial play which is totally recovered by means of the thrust of the springs 34 on the respective balls 35, pressing on the base 220 of the adjacent prism in turn. The thrust of the springs 34 is prevalently axial, parallel to the rotation axis of the prisms. The elastic thrust between the prisms is maximum by effect of the compression of the elastic springs 34 during the transition between two stable configurations of the prisms. The elastic thrust is minimum when the balls 35 fit into the respective hollows 30 at the stable configurations of the prisms.

Each prism 20a, 20b, 20c and 20d is stably aligned with an adjacent prism when the balls 35 between the two prisms are wedged into the respective hollows 30, allowing the alignment of the rectangular faces of the two right prisms.

The combination of the various aligned, stable positions of the right prisms allows to compose musical pieces which are suitable for studying and learning a musical instrument.

The mechanical device 1 allows to compose various music pieces, in particular rhythmic pieces, by stably maintaining the alignment of the prisms 20a, 20b, 20c and 20d, by virtue of the balls 35 stably accommodated in the respective hollows 30.

Similarly, the rhythmic musical piece may be modified by turning one or more prisms with respect to a reference prism, by manually applying a torque sufficient to move the balls 35 from the respective hollows 30.

Figure 1:
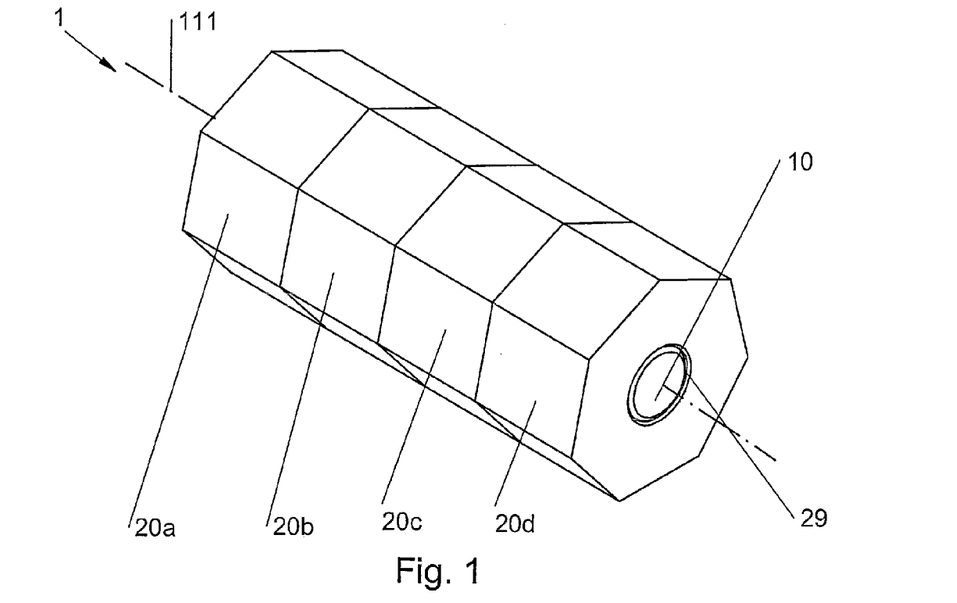
FIG. 1 shows a music teaching device in a stable configuration corresponding to a given rhythmic music piece, in accordance with an embodiment of the present invention.
Figure 2:
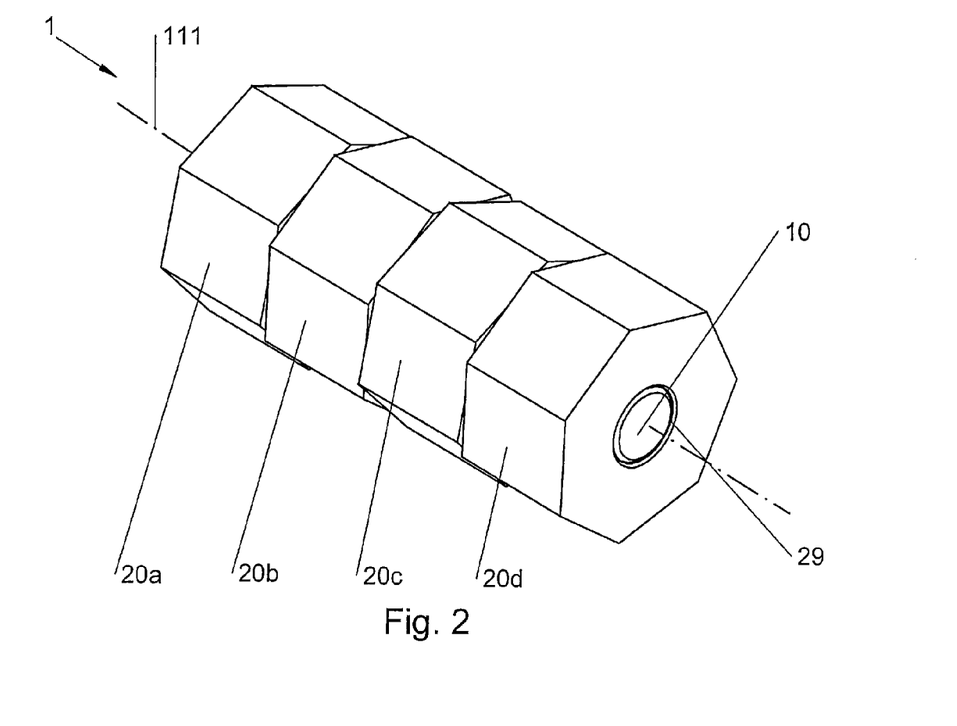
FIG. 2 shows the device in FIG. 1 during the step of transition between two stable configurations.

In a preferred embodiment of the invention, the device 1 is formed by four elements with octagonal base right prisms allowing to compose 2401 rhythmic musical pieces (FIGS. 1, 2).

Figure 11:
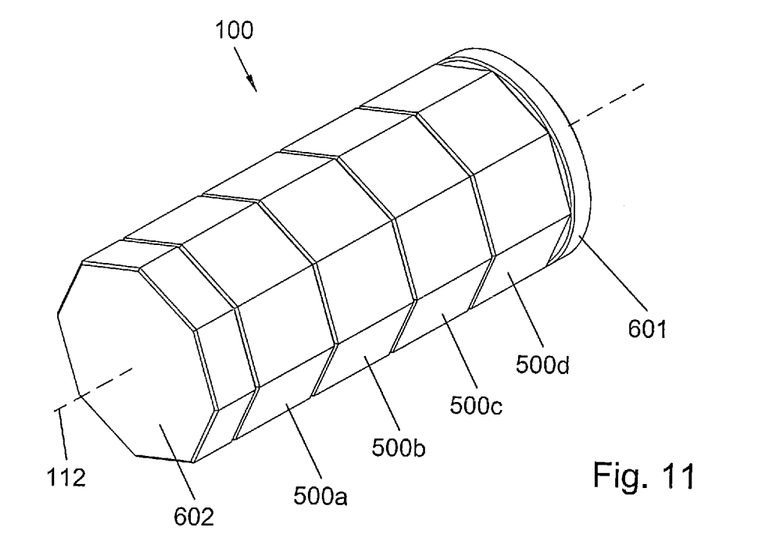
FIG. 11 shows a music teaching device in a stable configuration corresponding to a given rhythmic music piece, in accordance with a variant embodiment of the invention.
Figure 12:
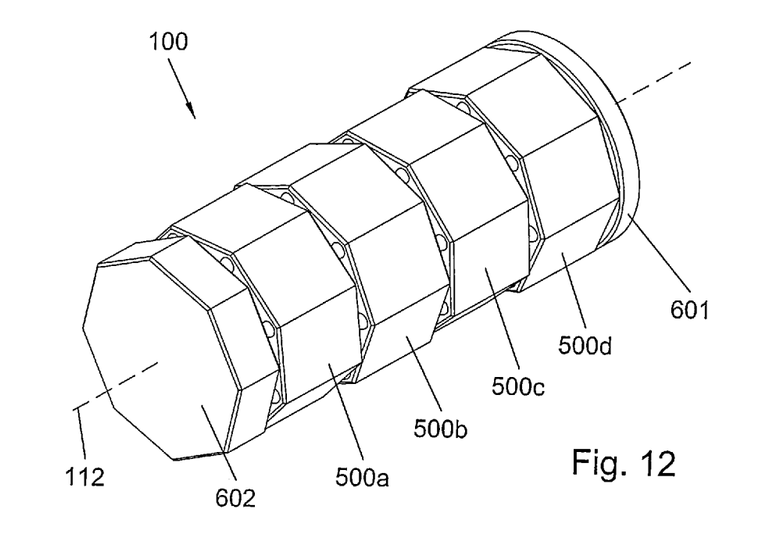
FIG. 12 shows the device in FIG. 11 during the step of transition between two stable configurations.
Figure 13:
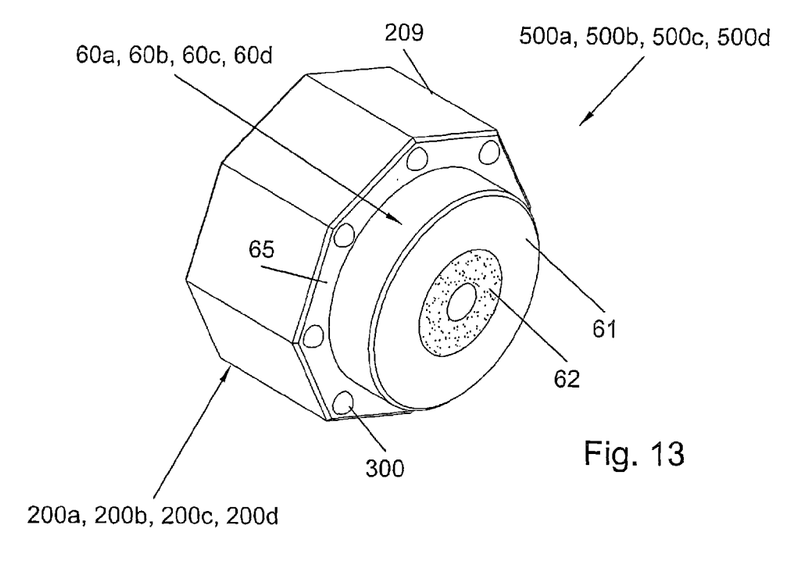
FIGS. 13 and 14 show perspective views of an element belonging to the device in FIGS. 11 and 12.
Figure 14:
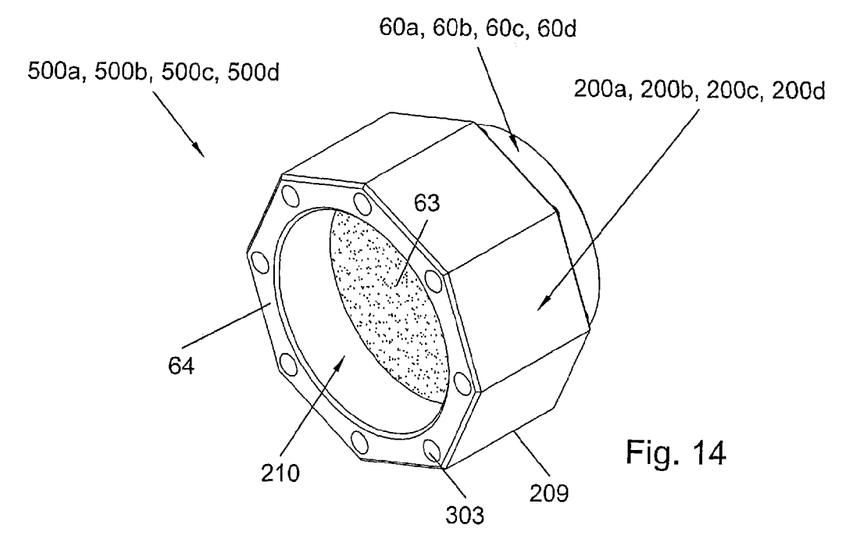

FIGS. 11 and 12 show a device 100 in accordance with a variant of embodiment of the invention. Such a device 100 comprises a plurality of coaxial elements 500a, 500b, 500c and 500d rotational about an axis 112, each comprising a prism 200a, 200b, 200c and 200d surmounted by a cylinder 60a, 60b, 60c and 60d (FIGS. 13 and 14).

Two further elements may be provided, a supporting disk 601 provided with a threaded central hole (not shown in the figures) adapted to fix the device 100 by means of a screw, and a closing element 602, respectively.

Each prism 200a, 200b, 200c and 200d is a right prism with rectangles having sides 201, 202, 203, 204, 205, 206, 207 and 208 of a base polygonal for base and the height 209 itself of the prism for height.

Each cylinder 60a, 60b, 60c and 60d is arranged in the center of the upper base of each prism 200a, 200b, 200c and 200d and has a diameter smaller than that of the circumference 302 inscribed in the base polygonal. An upper base portion 65 of each prism not occupied by the cylinder is provided with a series of pins 300 which are equally distributed on a circumference 301 comprised between the base perimeter of the cylinder and the circumference inscribed in the base polygonal 302. Preferably, the number of pins 300 are equal to the number of sides of the base polygonal.

Figure 15:
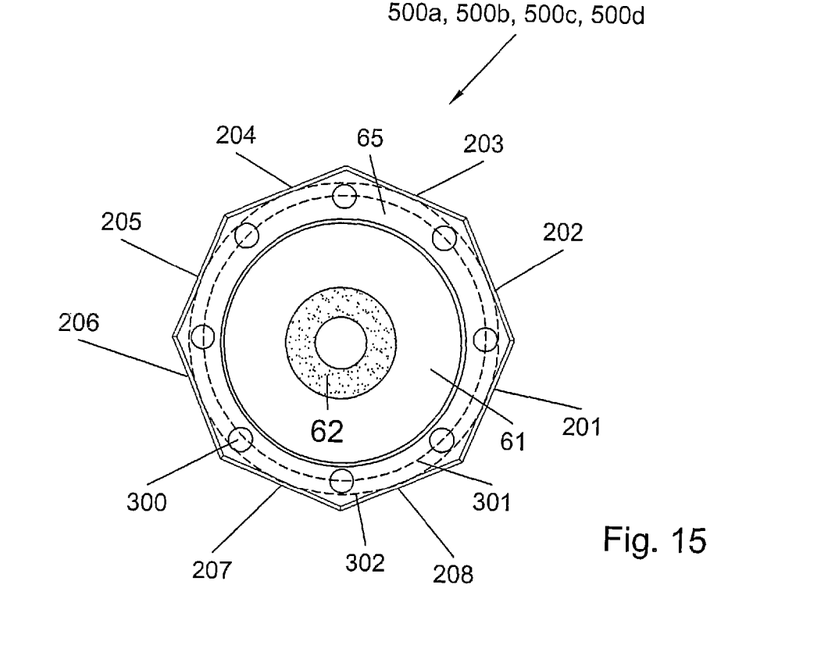
FIG. 15 shows a top plan view of the element belonging to the device in FIGS. 11 and 12.

Furthermore, the upper surface 61 of each cylinder 60a, 60b, 60c and 60d comprises a portion 62 made of magnetic material, preferably circular crown shaped (FIGS. 13 and 15). Alternatively, the magnetic portion 62 occupies the upper entire surface 61 of the cylinder.

Figure 16:
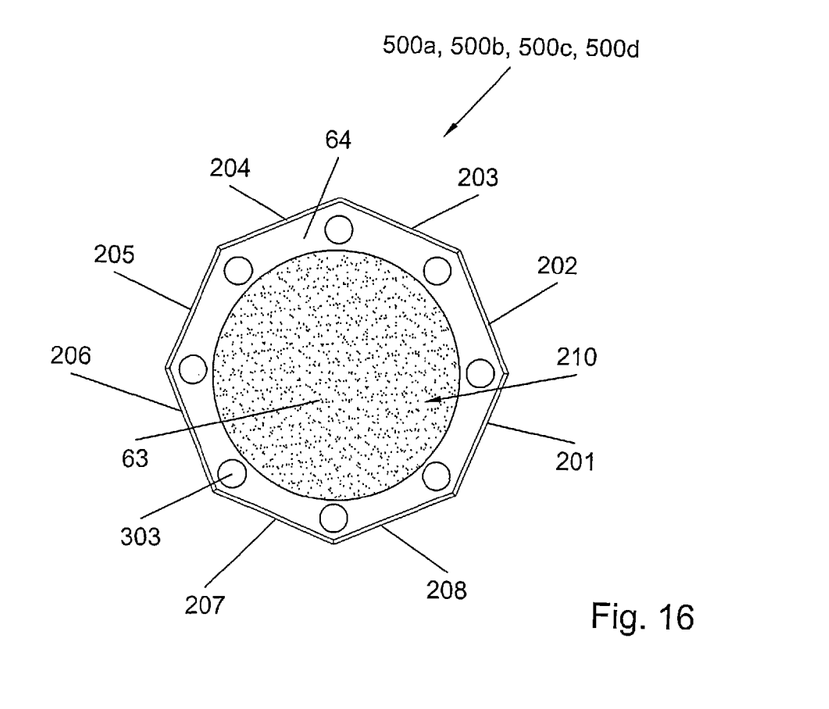
FIG. 16 shows a bottom plan view of the element belonging to the device in FIGS. 11 and 12.

Each prism 200a, 200b, 200c and 200d (FIGS. 14 and 16) has a cylindrical central hole 210 complementary to the cylinder 60a, 60b, 60c and 60d on the lower base. Such a hole 210 includes a bottom surface 63 coated with ferromagnetic material. The remaining lower base portion 64 of the prism outside the hole 210 is provided with a series of hollows 303 aligned with the pins 300, respectively.

A variant is in all cases possible including a portion 62 made of ferromagnetic material and the bottom surface 63 coated with magnetic material.

The elements 500a, 500b, 500c and 500d are assembled to each other by exploiting the magnetic attraction between elements. Considering, for example, the elements 500a and 500b, the cylinder 60b of the element 500b couples to the cylindrical hole 210 of the element 500a above and will be engaged to it by means of the magnetic force which will be created between the portion 62, present in the cylinder 60b, and the bottom surface 63, present in the hole 210 of the element 500a.

Each element 500a, 500b, 500c and 500d, is stably aligned with an adjacent element when the pins 300 of each element underneath are coupled to the respective hollows 303 of the element above, allowing the alignment of the rectangular faces of the right prisms 200a, 200b, 200c and 200d.

The combination of the various aligned, stable positions of the right prisms 200a, 200b, 200c and 200d allows to compose musical pieces which are suitable for studying and learning a musical instrument.

Also in this case, the mechanical device 100 allows to compose various musical pieces, in particular rhythmic pieces, by stably maintaining the alignment of the coaxial elements 500a, 500b, 500c and 500d, by virtue of the pins 300 stably accommodated in the respective hollows 303.

Similarly, the rhythmic musical piece can be modified by turning one or more prisms with respect to a reference prism, by manually applying a torque sufficient to move the pins 300 from the respective hollows 303.

In a preferred embodiment of the invention, the device 100 formed by four elements with octagonal base right prisms allows the composition of 4096 rhythmic musical pieces (FIGS. 11, 12).

Advantageously, the device 100 allows to vary the number of elements 500a, 500b, 500c and 500d easily.

The device 1, 100 is made starting from the assumption that 90% of the music currently circulating is developed in the tempo named 4/4 (in which there are 4 beats of 1/4 value in each measure). Each of the 4 disks is a beat (rhythmic pulsation), and the sum of the value of the notes (or respective pauses) represented on each face always corresponds to 1/4 for each face. Consequently, all combinations of musical phrases which can be produced will have a 4/4 tempo. For example, if a device 1, 100 with three prisms instead of four were made, it will produce only scores with a measure of 3/4.

Each face thus has the same value, i.e. the sum of the notes or of the pauses is equal for all faces.

Thus, the tempo type in which the phrases are produced changes by varying the number of prisms, while the number of combinations in a bar are increased or decreased by varying the number of faces.

Each combination produced by the device will correspond to a different written score.

The device 1, 100 produces thousands of combinations of rhythmic phrases which are read exactly as on a paper score; thus, phrases lasting for several measures may be produced by arranging several devices 1, 100 side by side.

One of the most apparent advantages of the invention is that of providing a quantity of musical rhythmic phrases which could fill hundreds of book pages in a pocket-sized object. For example, 65536 rhythmic musical pieces which could be represented on over 1000 paper pages can be composed with 16 faces per prism.

Furthermore, for students of percussion instruments, the device may represent combinations which include variables such as fingering (the hand to be used to play a respective note is shown) and accents (the notes to be played louder are indicated), which is a genuine breakthrough for studying such instruments in addition to providing practically unlimited applications.

Finally, an identification number may be provided on each face to remember the studied combinations.

The operating principle of the device 1, 100 may be applied to computerized simulation systems, for example software applications for smartphones, computers and the like.

The invention claimed is:

1. A music teaching device for the composition and the reading of a score, comprising coaxial elements assembled along a central axis and rotatable with respect thereto, wherein said coaxial elements are arranged according to a series of geometric stable configurations alternate to a series of geometric unstable configurations wherein,
   each of said coaxial element comprises a right prism and a cylinder on an upper base of said right prism,
   said right prism comprising a central cylindrical hole with an internal bottom surface of ferromagnetic material,
   said cylinder of a coaxial element being suitable to be rotatably housed into the central cylindrical hole of another coaxial element in order to couple the magnetic material of the cylinder of a coaxial element with the ferromagnetic material of the central cylindrical hole of another coaxial element,
   said coaxial elements being arranged according to a series of geometric stable configurations in which faces of the different right prisms are aligned allowing to compose musical pieces, alternate to a series of geometric unstable configurations in which said different right prisms are not aligned.

2. The device according to claim 1, wherein each of said cylinder is placed on the upper base of each prism leaving a portion of the upper base of each prism provided with a series of pins equally distributed on a circumference, and also by the fact that a remaining portion of a lower base of each prism outside the hole is provided with a series of hollows aligned with said pins, in said stable configurations a series of pins of a coaxial element being aligned and coupled with a series of hollows of another coaxial element.

* * * * *